US011675844B2

(12) United States Patent
Ni

(10) Patent No.: US 11,675,844 B2
(45) Date of Patent: *Jun. 13, 2023

(54) PROVIDING COMMAND BUNDLE SUGGESTIONS FOR AN AUTOMATED ASSISTANT

(71) Applicant: Google LLC, Mountain View, CA (US)

(72) Inventor: Yuzhao Ni, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,847

(22) Filed: Jan. 24, 2022

(65) Prior Publication Data

US 2022/0148595 A1 May 12, 2022

Related U.S. Application Data

(63) Continuation of application No. 16/692,432, filed on Nov. 22, 2019, now Pat. No. 11,232,155, which is a
(Continued)

(51) Int. Cl.
G06F 16/9032 (2019.01)
G10L 15/26 (2006.01)
(Continued)

(52) U.S. Cl.
CPC .... G06F 16/90332 (2019.01); G06F 16/3334 (2019.01); G06F 40/216 (2020.01);
(Continued)

(58) Field of Classification Search
CPC ........... G06F 16/3334; G06F 16/90332; G06F 40/216; G06F 40/30; G06F 40/35;
(Continued)

(56) References Cited

U.S. PATENT DOCUMENTS 9,047,271 B1 6/2015 Mengibar et al.
9,715,496 B1 7/2017 Sapoznik et al.
(Continued)

FOREIGN PATENT DOCUMENTS

CN 102750271 10/2012
CN 105247511 1/2016
(Continued)

OTHER PUBLICATIONS

European Patent Office; Summons to attend oral proceedings pursuant to Rule 115(1) EPC issued in Application No. 18792747.0; 11 pages; dated Sep. 3, 2021.
(Continued)

Primary Examiner — Angela A Armstrong
(74) Attorney, Agent, or Firm — Gray Ice Higdon

(57) ABSTRACT

Generating and/or recommending command bundles for a user of an automated assistant. A command bundle comprises a plurality of discrete actions that can be performed by an automated assistant. One or more of the actions of a command bundle can cause transmission of a corresponding command and/or other data to one or more devices and/or agents that are distinct from devices and/or agents to which data is transmitted based on other action(s) of the bundle. Implementations determine command bundles that are likely relevant to a user, and present those command bundles as suggestions to the user. In some of those implementations, a machine learning model is utilized to generate a user action embedding for the user, and a command bundle embedding for each of a plurality of command bundles. Command bundle(s) can be selected for suggestion based on comparison of the user action embedding and the command bundle embeddings.

20 Claims, 8 Drawing Sheets

Related U.S. Application Data continuation of application No. 15/730,514, filed on Oct. 11, 2017, now Pat. No. 10,546,023.

(60) Provisional application No. 62/567,732, filed on Oct. 3, 2017.

(51) Int. Cl.
| | |
|---|---|
| *G06N 3/02* | (2006.01) |
| *G10L 15/22* | (2006.01) |
| *G06F 16/33* | (2019.01) |
| *G06N 3/006* | (2023.01) |
| *G06N 3/084* | (2023.01) |
| *G06F 40/35* | (2020.01) |
| *G06F 40/216* | (2020.01) |
| *G10L 15/18* | (2013.01) |
| *G06N 5/022* | (2023.01) |

(52) U.S. Cl.
CPC .............. *G06F 40/35* (2020.01); *G06N 3/006* (2013.01); *G06N 3/02* (2013.01); *G06N 3/084* (2013.01); *G10L 15/18* (2013.01); *G10L 15/22* (2013.01); *G10L 15/26* (2013.01); *G06N 5/022* (2013.01); *G10L 2015/223* (2013.01); *G10L 2015/227* (2013.01); *G10L 2015/228* (2013.01)

(58) Field of Classification Search
CPC .......... G06N 3/006; G06N 3/02; G06N 3/084; G06N 5/022; G10L 15/18; G10L 15/22; G10L 15/26; G10L 2015/223; G10L 2015/227; G10L 2015/228
See application file for complete search history.

(56) References Cited

U.S. PATENT DOCUMENTS

| 10,546,023 | B2* | 1/2020 | Ni ....................... G06F 16/3334 |
| 11,232,155 | B2* | 1/2022 | Ni ....................... G06F 40/216 |
| 2001/0041980 | A1 | 11/2001 | Howard et al. |
| 2009/0228479 | A1 | 9/2009 | Nishiyama |
| 2015/0140990 | A1 | 5/2015 | Kim et al. |
| 2016/0118048 | A1 | 4/2016 | Heide |
| 2016/0248847 | A1 | 8/2016 | Saxena et al. |
| 2018/0081331 | A1 | 3/2018 | Gary et al. |
| 2018/0277123 | A1 | 9/2018 | Boesen et al. |
| 2018/0336269 | A1* | 11/2018 | Dobrynin ............ G06F 16/3322 |

FOREIGN PATENT DOCUMENTS

| CN | 106415412 | 2/2017 |
| CN | 107210033 | 9/2017 |
| JP | 2006317722 | 11/2006 |
| JP | 2018531404 | 10/2018 |
| KR | 20160117403 | 10/2016 |
| KR | 101741647 | 5/2017 |
| WO | 2016205147 | 12/2016 |
| WO | 2017053208 | 3/2017 |

OTHER PUBLICATIONS

Japanese Patent Office; Notice of Allowance issued in Application No. 2019-568392; 3 pages; dated Oct. 18, 2021.

Korean Patent Office; Notice of Allowance issue in Application No. 1020197036636; 3 pages; dated Jul. 13, 2021.

Japanese Patent Office; Office Action issued in Application No. 2019-568392; 4 pages; dated Apr. 12, 2021.

Intellectual Property India; Office Action issue in Application No. 201927049781; 5 pages; dated Apr. 5, 2021.

Korean Patent Office; Office Action issue in Application No. 1020197036636; 8 pages; dated Jan. 25, 2021.

European Patent Office; Communication Pursuant to Article 94(3) issue in Application No. 18792747.0; 9 pages; dated Jul. 1, 2020.

Pattar, S. et al., "Implementation of Home Automation through Internet of Things", Journal of Network Communications and Emerging Technologies, vol. 6, No. 12, www.jncet.org, 6 pages, dated Dec. 2016.

Rasch, K., "Smart assistants for smart homes", Doctoral Thesis in Electronic and Computer Systems, Royal Institute of Technology, Stockholm, Sweden; retrieved from internet: URL:http://www.diva-portal.org/smash/get/diva2:650328/FULLTEXT01.pdf, [retrieved on Jan. 7, 2019], 79 pages Sep. 2013.

Sun, M. et al., "An Intelligent Assistant for High-Level Task Understanding", Intelligent User Interfaces, ACM, 6 pages, Mar. 7, 2016.

Mayrhofer, R. et al., "Recognizing and Predicting Context by Learning from User Behavior", Radiomatics: Journal of Communication Engineering, special issue on Advances in Mobile Multimedia, retrieved from internet: URL:https://www.mayrhofer.eu.org/publications [retrieved on Jan. 7, 2019], 13 pages, May 2004.

European Patent Office, International Search Report and Written Opinion of PCT Ser. No. PCT/US2018/054012, 19 pages, dated Jan. 15, 2019.

European Patent Office; Intention to Grant issued in Application No. 18792747.0, 55 pages, dated Jun. 3, 2022.

European Patent Office; Intention to Grant issued in Application No. 18792747.0, 55 pages, dated Oct. 27, 2022.

China National Intellectual Property Administration; Notification of First Office Action issued in Application No. 201880038793.2; 57 pages; dated Mar. 30, 2023.

\* cited by examiner

PROVIDING COMMAND BUNDLE SUGGESTIONS FOR AN AUTOMATED ASSISTANT

BACKGROUND

An automated assistant (also known as a "personal assistant", "mobile assistant", etc.) may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output) and/or by controlling one or more peripheral devices (e.g., Internet of things (IoT) device(s)). An automated assistant interacted with via a client device may be implemented via the client device itself and/or via one or more remote computing devices that are in network communication with the client device (e.g., computing device(s) in "the cloud").

Automated assistants are often configured to perform a variety of actions, with each action being performed in response to a predetermined canonical command (or a slight variation thereof) that is mapped to the action. For example, in response to receiving a spoken command of "Assistant, turn off my living room lights", an automated assistant can cause one or more commands to be transmitted that cause networked lights of the user, that are labeled as "living room" lights, to be transitioned to an "off" state. As another example, in response to receiving a separate spoken command of "Assistant, what is tomorrow's weather", an automated assistant can issue one or more queries and/or interact with a third-party agent to resolve a prediction for "tomorrow's weather" for a location of the user issuing the spoken command, and provide graphical and/or audible output that relays tomorrow's predicted weather.

However, a user that utilizes an automated assistant may not be aware of many of the actions that are performable by an automated assistant and/or may not be aware of the canonical commands that can be provided by the user to cause the actions to be performed by the automated assistant. As a result, many users may employ only a limited amount of the functionality of an automated assistant. Although a general recommendation for a canonical command and an associated action can be provided to a user that is interacting with an automated assistant (e.g., "Try saying X to get a weather report for tomorrow"), oftentimes such a general recommendation is blindly provided to the user. As a result, significant network and/or computational resources can be wasted in providing users with recommendations that are irrelevant. Moreover, oftentimes such a general recommendation is for only a single action. To perform multiple actions, multiple disparate canonical commands must be provided by a user through a plurality of dialog turns with an automated assistant, thereby consuming significant network and/or computational resources in the performance of multiple actions.

SUMMARY

This specification is directed methods, apparatus, and computer-readable media (transitory and non-transitory) for generating and/or recommending command bundles for a user of an automated assistant application. A command bundle comprises a plurality of discrete actions that can be performed by an automated assistant application. For example, a "good night" bundle can cause the automated assistant application to perform: a first action of transmitting a command to turn off one or more networked lights; a second action of transmitting a command to set an alarm, of a computing device of a user, to sound at 8:00 AM; a third action of transmitting a command that requests "tomorrow's" local weather, and audibly presenting responsive content; etc.

As appreciated from the preceding example, one or more of the actions of a command bundle can cause transmission of a corresponding command and/or other data to one or more devices and/or agents that are distinct from devices and/or agents to which data is transmitted based on other action(s) of the bundle. For instance, in the preceding example, for the first action a command can be transmitted to networked light(s) (and/or a hardware bridge in communication with the networked light(s)), whereas in the third action a separate command can be transmitted to a remote computing device that hosts a "weather" agent. Command bundles can be activated in response to various cues, such as speaking of one of one or more invocation phrases for the command bundle (e.g., "good night" for the "good night" bundle), actuating a graphical user interface element for the command bundle (e.g., a "shortcut" icon for the command bundle), and/or the occurrence of one or more contextual conditions (e.g., for the "good night" bundle, the occurrence of it being 10:00 PM).

Command bundles can be generated from scratch and/or based on historical data collected during interactions between one or more users and an automated assistant(s). For example, a command bundle can be generated from scratch by a programmer specifying actions for the command bundle and, for each of one or more of the actions, optionally specifying one or more fixed slot values for one or more slots of the action. As another example, a command bundle can be generated automatically by collecting command phrases that are issued, by each of a plurality of corresponding users, within a short time frame of one another—and generating a corresponding command bundle that, when activated, causes actions associated with the collected command phrases to be performed. For instance, a command bundle with first, second, and third actions can be automatically generated based on at least a threshold quantity of users each causing the first, second, and third actions to be performed within one minute of one another through interaction with their automated assistants.

Implementations disclosed herein relate to determining command bundles that are likely relevant to a given user, and presenting those command bundles as suggestions/recommendations to the given user. In some of those implementations, a machine learning model can be trained that receives, as input, indications of one or more automated assistant "actions" (and optionally slot value(s) and/or other parameter(s) for the action(s)) and provides, as output, an embedding that provides, in a multi-dimensional space, a semantic representation of those "actions" (and optionally slot value(s) and/or other parameter(s)).

Actions performed by the given user via an automated assistant application (and optionally slot value(s) and/or other parameter(s) for the action(s)) can be processed using the machine learning model to generate a "user action embedding". Further, for each of the command bundles, actions of the command bundle (and optionally slot value(s) and/or other parameter(s) for the action(s)) can be processed using the machine learning model (or another machine learning model) to generate a "command bundle embedding". Command bundle(s) having "command bundle embeddings" that are most similar to the "user action embedding" can then be provided to the given user as recommendation(s). For example, if the given user only uses the automated assistant application for "music" and "lighting control" actions, the "user action embedding" can represent those actions. Command bundles having corresponding "music" and "lighting control" actions will have command bundle embeddings that are more similar to the "user action embedding" than, for example, command bundles that lack and music or lighting control actions. In these and other manners, command bundles that are graphically and/or audibly recommended to the given user can first be determined to likely be relevant to the given user, through comparison of features of the command bundles to features of past interactions of the given user with the automated assistant application.

Further, in some implementations, required peripheral devices and/or other parameter(s) of one or more action(s) of a command bundle may be considered in determining whether to recommend the command bundle to a user. For example, some command bundles can be filtered out (e.g., before the similarity determinations) based on determining the given user lacks required peripheral device(s) for the command bundle. For instance, a given command bundle that requires a networked light for performance of an action can be filtered out from consideration as a recommendation to a given user, based on determining that no networked lights have been associated with the given user for the automated assistant application. Also, for example, indications of peripheral devices of the user and/or peripheral devices of the command bundles can additionally be applied as input in generating the user embedding and/or the command bundle embeddings as described above and elsewhere herein.

In some implementations, at least one action of a command bundle recommended to a given user can include at least one slot that lacks a fixed value (i.e., a slot with an explicit "undefined" or "variable" value, or a slot that lacks definition of any value for the slot). In some of those implementations, when the command bundle is selected by the given user, or subsequently initially invoked by the given user, the automated assistant application can prompt the given user to enable resolution of a value for the slot that lacks a fixed value. In some version of those implementations, the resolved value for the slot can be stored in association with the given user and thereafter automatically utilized in response to further invocations of the command bundle. For example, a command bundle can include an action of transmitting a command to set an alarm of a computing device of a user. However, an "alarm time" slot of the alarm action may not be fixed. In some of those implementations, the automated assistant application can provide, for presentation to the user, a prompt of "What time would you like the alarm set for", and responsive user interface input of "8:00 AM" received in response to the prompt. The automated assistant application can store "8:00 AM" as the resolved value for the "alarm time" slot for the command bundle for the user, optionally after confirming that the user would like it set as a default. Thereafter, the automated assistant application can automatically utilize "8:00 AM" as the slot value for the "alarm time" slot when that command bundle is invoked by the given user.

Particular implementations of the subject matter described in this specification can be implemented so as to realize one or more of the following advantages. Command bundle recommendation methods, and/or model(s) utilized in command bundle recommendations, can provide for improved data efficiency compared to other methods. For example, such recommendation methods and/or models can increase the likelihood that a command bundle recommendation provided to a given user is relevant to the given user and resultantly increase the likelihood that the given user will subsequently utilize the command bundle. This can mitigate the consumption of network resources and/or computational resources in provision of irrelevant command bundles.

Moreover, as described herein, in many implementations a recommended command bundle can, when subsequently invoked, cause a plurality of discrete actions to be performed. Such subsequent invocation can be achieved with subsequent user interface input that consumes less network and/or computational resources than if each of the plurality of the discrete actions was invoked individually. For example, the "good night" bundle described above can be invoked through a spoken command provided to the automated assistant, such as "Assistant, good night". Invocation of the "good night" bundle can cause the automated assistant application to perform: a first action of transmitting a command to turn off one or more networked lights; a second action of transmitting a command to set an alarm, of a computing device of a user, to sound at 8:00 AM; and a third action of transmitting a command that requests "tomorrow's" local weather, and audibly presenting responsive content. In absence of the command bundle, a user would need to issue at least three separate commands, which, to process, would require a greater consumption of network and/or computational resources than the single invocation command of the command bundle. For example, absent the command bundle, the user may have to issue three separate commands of: "Assistant, turn off the lights"; "Assistant, set the alarm on my mobile phone to 8:00 AM"; and "Assistant, what is tomorrow's weather".

Additionally, and as also described herein, in many implementations a recommended command bundle can include at least one slot that lacks a fixed value, and a value for that slot can be resolved for a given user through interaction (e.g., automated assistant-to-user dialog) with the given user. Thereafter, when the given user causes the command bundle to be invoked, the resolved value can be utilized, optionally without prompting the user for any confirmation. In these and other manners, subsequent invocation of the command bundle by the user can be made more efficient through obviating of one or more prompts that would otherwise need to be provided to resolve a value for the slot.

The summary above is provided as an overview of some features of various implementations disclosed herein. Additional description is provided below of those implementations, and of various additional features and various additional implementations.

In some implementations, a method performed by one or more processors is provided and includes identifying assistant interaction data for a user, and processing at least part of the assistant interaction data using a trained machine learning model to generate a user action embedding. The assistant interaction data indicates a plurality of historical actions performed for the user by an automated assistant application. Each of the historical actions is performed in response to corresponding user interface input provided by the user via one or more automated assistant interfaces that interact with the automated assistant application. The method further includes identifying a plurality of command bundles that each include command bundle data that identifies a plurality of corresponding discrete actions that can be performed by the automated assistant application. The method further includes, for each of the command bundles: processing at least part of the command bundle data using the trained machine learning model, or an additional trained machine learning model, to generate a command bundle embedding, and generating a similarity score for the command bundle. Generating the similarity score for each of the command bundles includes comparing the user action embedding to the command bundle embedding for the command bundle. The method further includes selecting a given command bundle, of the plurality of command bundles, based on the similarity score for the given command bundle. The method further includes, in response to selecting the given command bundle, causing information related to the given command bundle to be presented to the user via a computing device of the user. Invocation of the given command bundle, for the user in response to user interface input, causes the automated assistant application to perform the corresponding discrete actions of the given command bundle.

These and other implementations of technology disclosed herein may optionally include one or more of the following features.

In some implementations, the information related to the given command bundle that is presented to the user includes an invocation phrase for the given command bundle. In some of those implementations, the method further includes: receiving, subsequent to causing the information related to the given command bundle to be presented, natural language user interface input provided by the user via one of the assistant interfaces; determining the natural language user interface input conforms to the invocation phrase; and in response to determining the natural language user interface input conforms to the invocation phrase: performing, by the automated assistant application, the corresponding discrete actions of the given command bundle.

In some implementations, the corresponding discrete actions of the given command bundle include a first discrete action and a second discrete action. In some of those implementations, the first discrete action causes the automated assistant application to transmit a first command to a first electronic device and the second discrete action causes the automated assistant application to transmit a second command to a second electronic device. In some of those implementations, the first discrete action causes the automated assistant application to transmit a first command to a first agent and the second discrete action causes the automated assistant application to transmit a second command to a second agent.

In some implementations, the method further includes ranking the command bundles based on the similarity scores. In some of those implementations, selecting the given command bundle is based on the ranking of the given command bundle relative to the other of the command bundles. In some version of those implementations, causing the information related to the given command bundle to be presented to the user via a computing device of the user includes causing the information to be presented with a display prominence that is based on the ranking of the given command bundle.

In some implementations, identifying the plurality of command bundles includes: selecting, from a corpus of available command bundles, the plurality of command bundles based on conformance between the selected plurality of command bundles and user specific data of the user. In some of those implementations, selecting the plurality of command bundles based on conformance between the selected plurality of command bundles and user specific data of the user includes excluding a given available command bundle, of the available command bundles, from the selected plurality of command bundles based on: identifying a required peripheral device for the given available command bundle; and determining, based on the user specific data, that the automated assistant application lacks access, for the user, to the required peripheral device.

In some implementations, the processing of the at least part of the command bundle data is performed using the trained machine learning model.

In some implementations, generating the similarity score for each of the command bundles is based on a Euclidean distance between the user action embedding and the command bundle embedding for the command bundle.

In some implementations, the given command bundle includes at least one slot, with an undefined value, for at least one action of the corresponding actions. In some of those implementations, the method further includes: receiving a selection of the given command bundle in response to causing the information related to the given command bundle to be presented; in response to receiving the selection, engaging in a dialog with the user, via the automated assistant application, to resolve a value for the slot; and storing the value in association with the slot, for the given command bundle and for the user. In some version of those implementations, the method further includes, subsequent to storing the value in association with the slot, for the given command bundle and for the user: receiving natural language user interface input provided by the user via one of the assistant interfaces; determining the natural language user interface input conforms to an invocation phrase for the command bundle; and in response to determining the natural language user interface input conforms to the invocation phrase, and based on the value being stored: performing, by the automated assistant application, the corresponding discrete actions of the given command bundle, including performing the at least one action using the value for the slot.

In some implementations, a method performed by one or more processors is provided and includes identifying a corpus of command bundles and identifying peripheral device data for a user. Each of the identified command bundles include command bundle data that identifies a plurality of corresponding discrete actions that can be performed by an automated assistant application. The identified peripheral device data indicates peripheral devices of the user that are paired with an automated assistant application. The method further includes selecting, from the corpus of command bundles, a plurality of candidate command bundles for the user. Selecting the plurality of candidate command bundles is based on comparison of the peripheral device data to the command bundle data of the command bundles. The method further includes ranking the candidate command bundles based on the command bundle data and assistant interaction data, and causing information related to one or more of the candidate command bundles to be presented based on the ranking. The information is presented to the user via a computing device of the user.

These and other implementations of technology disclosed herein may optionally include one or more of the following features.

In some implementations, the information related to a given command bundle, of the one or more command bundles, includes an invocation phrase for the given command bundle. In some of those implementations, the method further includes: receiving, subsequent to causing the information related to the one or more command bundles to be presented, natural language user interface input provided by the user via an assistant interface associate with the automated assistant application; determining the natural language user interface input conforms to the invocation phrase; and in response to determining the natural language user interface input conforms to the invocation phrase: performing, by the automated assistant application, the corresponding discrete actions of the given command bundle. In some version of those implementations, the corresponding discrete actions of the given command bundle include a first discrete action that causes the automated assistant application to transmit a first command to a first electronic device, and a second discrete action that causes the automated assistant application to transmit a second command to a second electronic device.

In some implementations, a method performed by one or more processors is provided and includes identifying a corpus of command bundles and identifying data for a user. Each of the command bundles of the corpus includes command bundle data that identifies a plurality of corresponding discrete actions that can be performed by an automated assistant application. The method further includes selecting, from the corpus of command bundles, a plurality of candidate command bundles for the user. Selecting the plurality of candidate command bundles is based on comparison of the data of the user to the command bundle data of the command bundles. The method further includes identifying assistant interaction data for the user that indicates a plurality of historical actions performed for the user by an automated assistant application. The method further includes: processing at least part of the assistant interaction data using a trained machine learning model to generate a user action embedding; and selecting, from the plurality of candidate command bundles, a given command bundle based on comparison of the user action embedding to a command bundle embedding for the given command bundle. The method further includes, in response to selecting the given command bundle, causing information related to the given command bundle to be presented to the user via a computing device of the user. Invocation of the given command bundle, for the user in response to user interface input, causes the automated assistant application to perform the corresponding discrete actions of the given command bundle.

These and other implementations of technology disclosed herein may optionally include one or more of the following features.

In some implementations, the information related to the given command bundle that is presented to the user includes an invocation phrase for the given command bundle. In some of those implementations, the method further includes: receiving, subsequent to causing the information related to the given command bundle to be presented, natural language user interface input provided by the user via an assistant interface; determining the natural language user interface input conforms to the invocation phrase; and in response to determining the natural language user interface input conforms to the invocation phrase: performing, by the automated assistant application, the corresponding discrete actions of the given command bundle.

In some implementations, the given command bundle includes at least one slot, with an undefined value, for at least one action of the corresponding actions. In some of those implementations, the method further includes: receiving an invocation of the given command bundle subsequent to causing the information related to the given command bundle to be presented; in response to receiving the invocation, engaging in a dialog with the user, via the automated assistant application, to resolve a value for the slot; and storing the value in association with the slot, for the given command bundle and for the user. In some versions of those implementations, the method further includes, subsequent to storing the value in association with the slot, for the given command bundle and for the user: receiving natural language user interface input provided by the user via an assistant interface; determining the natural language user interface input conforms to an invocation phrase for the command bundle; and in response to determining the natural language user interface input conforms to the invocation phrase, and based on the value being stored: performing, by the automated assistant application, the corresponding discrete actions of the given command bundle, including performing the at least one action using the value for the slot.

In addition, some implementations include one or more processors of one or more computing devices, where the one or more processors are operable to execute instructions stored in associated memory, and where the instructions are configured to cause performance one or more methods described herein. The processors may include one or more graphics processing units (GPUs), central processing units (CPUs), and/or tensor processing units (TPUs). Some implementations include one or more non-transitory computer readable storage media storing computer instructions executable by one or more processors to perform one or more methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
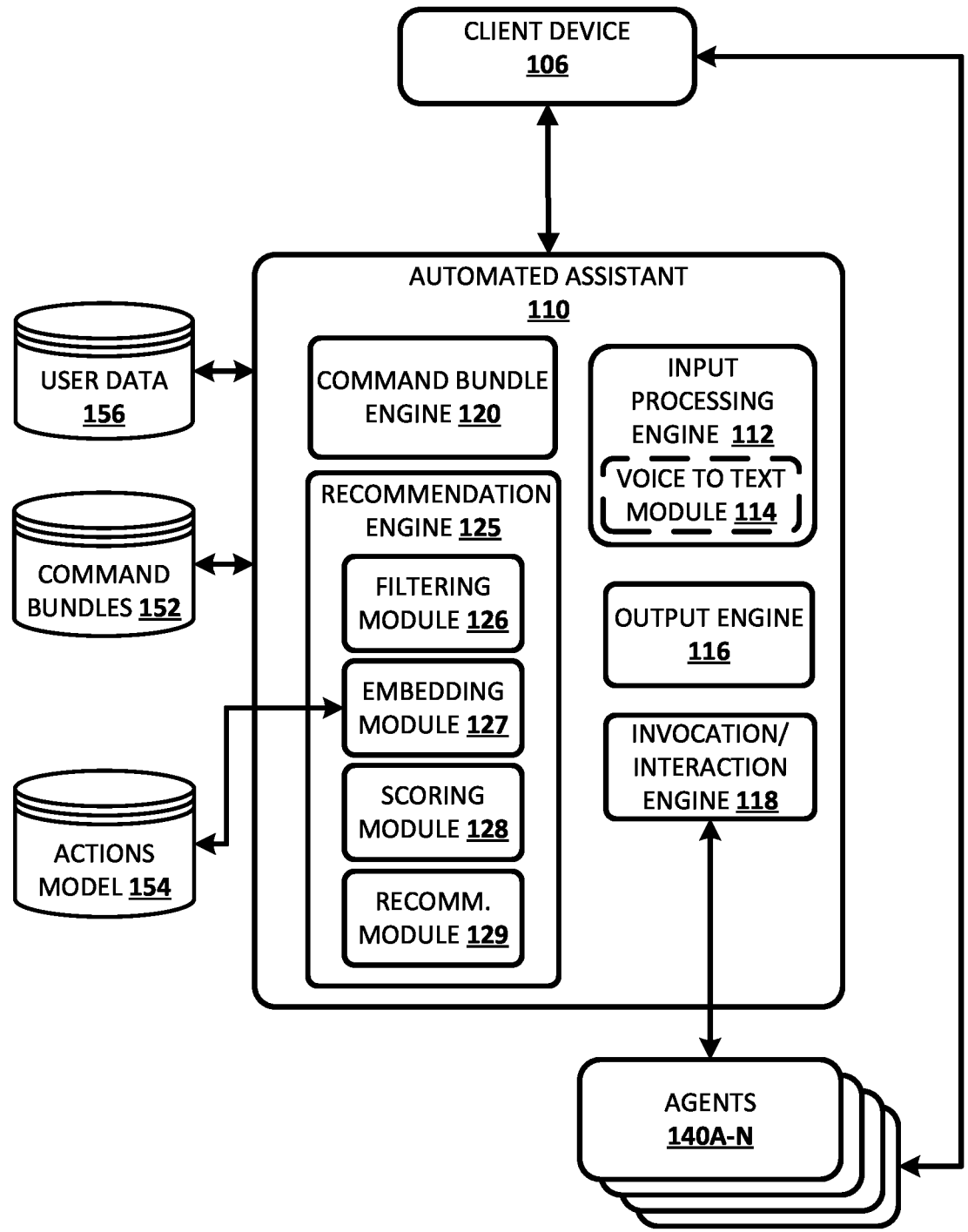
FIG. 1 is a block diagram of an example environment in which implementations disclosed herein may be implemented.

FIG. 1 illustrates an example environment in which techniques disclosed herein may be implemented. The example environment includes a client device 106, an automated assistant 110 (also referred to herein as an automated assistant application), and a plurality of agents 140A-N. The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations, input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet).

Although only one client device 106 is illustrated in combination with the automated assistant 110, in many implementations the automated assistant 110 may be remote and may interface with each of a plurality of client devices of the same user and/or with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 communicates with each of a plurality of agents 140A-N via an API and/or via one or more communications channels (e.g., an internal communications channel and/or a network, such as a WAN). In some implementations, one or more of the agents 140A-N are each managed by a respective party that is separate from a party that manages the automated assistant 110. As used herein, an "agent" references one or more computing devices and/or software that are utilized by the automated assistant 110. In some situations, an agent can be separate from the automated assistant 110 and/or may communicate with the automated assistant 110 over one or more communication channels. In some of those situations, the automated assistant 110 may transmit, from a first network node, data (e.g., an agent command) to a second network node that implements all or aspects of the functionality of the agent. In some situations, an agent may be a third-party (3P) agent, in that it is managed by a party that is separate from a party that manages the automated assistant 110. In some other situations, an agent may be a first-party (1P) agent, in that it is managed by the same party that manages the automated assistant 110.

An agent is configured to receive (e.g., over a network and/or via an API) an invocation request and/or other agent commands from the automated assistant 110. In response to receiving an agent command, the agent generates responsive content based on the agent command, and transmits the responsive content for the provision of user interface output that is based on the responsive content and/or to control one or more peripheral devices. For example, the agent can transmit the responsive content to control one or more peripheral devices such as one or more IoT devices (e.g., smart lights, thermostats, appliances, cameras). As another example, the agent may transmit the responsive content to the automated assistant 110 for provision of output, by the automated assistant 110, that is based on the responsive content. As another example, the agent can itself provide the output. For instance, the user can interact with the automated assistant 110 via an assistant interface of the client device 106 (e.g., the automated assistant can be implemented on the client device 106 and/or in network communication with the client device 106), and the agent can be an application installed on the client device 106 or an application executable remote from the client device 106, but "streamable" on the client device 106. When the application is invoked, it can be executed by the client device 106 and/or brought to the forefront by the client device 106 (e.g., its content can take over a display of the client device 106).

The automated assistant 110 includes an input processing engine 112, an output engine 116, and an invocation/interaction engine 118. The automated assistant 110 also includes a command bundle engine 120 and a recommendation engine 125. The recommendation engine 125 includes a filtering module 126, an embedding module 127, a scoring module 128, and a recommendation module 129. In some implementations, some of the engines (and/or modules) of automated assistant 110 may be omitted, combined, and/or implemented in a component that is separate from automated assistant 110. Moreover, automated assistant 110 may include additional engines (and/or modules) not illustrated herein for the sake of simplicity.

The automated assistant 110 receives instances of user input from the client device 106. Various types of user input can be provided by a user, via user interface input device(s), to the automated assistant 110. In some instances the input may be a "user utterance" that is free-form natural language input, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

As one example, the automated assistant 110 may receive a user utterance in the form of a natural language data stream including a sequence of tokens. For instance, the automated assistant 110 can receive a natural language data stream in response to typed user input or can receive a natural language voice input data stream in the form of a streaming audio recording. The streaming audio recording may be generated by the client device 106 in response to signals received from a microphone of the client device 106 that captures spoken input of a user of the client device 106. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input.

The automated assistant 110 provides an instance of output in response to receiving an instance of user input from the client device 106. The instance of output may be, for example, a "system utterance" that includes natural language output. The system utterance can be provided as audio to be audibly presented by the client device 106 (e.g., output via a speaker of the client device 106) and/or as text and/or graphical content to be graphically presented by the client device 106 (e.g., rendered via a display of the client device 106), etc. As described herein, some instances of the output can be system utterances determined based on a command bundle that is invoked by a user input. As also described herein, some instance of the output can be recommendations for one or more command bundles. The recommendations can optionally be "pushed" to the user (i.e., provided without receipt of user input that explicitly requests the recommendations), or can be provided to the user in response to user input, such as input that seeks to explore available command bundles. Also, some instances of the output may be based on responsive content generated by a selected one of the agents 140A-N (e.g., in response to agent command(s) transmitted in response to invocation of a command bundle).

The input processing engine 112 of automated assistant 110 processes natural language input (e.g., natural language input received from client device 106), and generates annotated output for use by one or more other components of the automated assistant 110. For example, the input processing engine 112 may process natural language free-form input that is generated by a user via one or more user interface input devices of client device 106. The generated annotated output can include tokens that are based on the natural language input and can optionally include one or more annotations of the natural language input.

In some implementations, the input processing engine 112 includes a voice to text module 114 that receives an instance of voice input (e.g., in the form of digital audio data), and converts the voice input into text that includes one or more text words or phrases. The converted text can then be utilized by the input processing engine 112 to generate tokens and/or other data. In some implementations, the voice to text module 114 is a streaming voice-to-text engine that uses one or more voice-to-text algorithms to generate text based on voice input. The voice to text module 114 may rely on one or more stored voice to text models (also referred to as language models) that each may model a relationship between an audio signal and phonetic units in a language, along with word sequences in the language.

In some implementations, the input processing engine 112 is configured to identify and annotate various types of grammatical information in natural language input. For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the input processing engine 112 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity to resolve a particular entity. In some implementations, entities resolved for tokens may be utilized as slot values for corresponding slots in addition to, or in lieu of, tokens that are determined to correspond to those slots.

In some implementations, the input processing engine 112 may additionally and/or alternatively include a coreference resolver configured to group, or "cluster," references to the same entity based on one or more contextual cues. For example, the coreference resolver may be utilized to resolve the term "it" in an instance of user input to a preceding mention of "Restaurant A" in an immediately preceding instance of user input. In some of those implementations, the tokens supplied by the input processing engine 112 may include a referent of a pronoun in place of the pronoun itself. For example, "Restaurant A" can be provided as a token instead of "it."

In some implementations, one or more components of the input processing engine 112 may rely on annotations from one or more other components of the input processing engine 112. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the input processing engine 112 may use related prior input and/or other related data outside of the particular natural language input to determine one or more annotations.

The output engine 116 provides instances of output to the client device 106. An instance of output can be, for example, recommendation(s) for command bundle(s) generated by recommendation engine 125, or based on responsive content from one or more of the agents 140A-N in execution of a command bundle by command bundle engine 120 (when the automated assistant 110 acts as an intermediary for that agent). In some implementations, the output engine 116 may include a text to speech engine that converts textual components of responsive content to an audio format, and the output provided by the output engine 116 is in an audio format (e.g., as streaming audio). In some implementations, the responsive content may already be in an audio format. In some implementations, the output engine 116 additionally or alternatively provides textual reply content as output (optionally for conversion by the client device 106 to audio) and/or provides other graphical content as output for graphical display by the client device 106.

The invocation/interaction engine 118 transmits agent command(s) to one or more of the agent(s) 140A-N. For example, when a command bundle is invoked that includes a plurality of actions for a plurality of the agents 140A-N, the invocation/interaction engine 118 can generate and transmit agent commands to multiple of the agents 140A-N to cause performance of those actions. An agent command can be a structured command that includes slot value(s) in associated slots, and optionally additional data such as an indication of a domain (e.g., where the agent operates over multiple domains), a user identifier, a session identifier, etc. In some implementations or situations, the agent command is an invocation command that invokes the selected agent. The selected agent can generate responsive content in response to the agent command. In some implementations, the responsive content is transmitted, by the selected agent to the automated assistant 110, and the output engine 116 generates output based on the responsive content. For example, the output engine 116 can provide the responsive content, unaltered, as output—or can perform a text to speech conversion (or other conversion) of the responsive content, and provide the converted content as output. In some implementations, the responsive content is transmitted, by the selected agent, directly to the client device 106. In other implementations, the selected agent may operate locally on the client device 106 (e.g., be an application installed on the client device 106), and can generate the responsive content for direct display on the client device 106. In yet other implementations, the responsive content can be transmitted to one or more peripheral devices and cause states of one or more of the peripheral devices (e.g., IoT devices) to be altered.

Each of the agents 140A-N may include its own content engine, and/or other engines. Moreover, in many implementations an agent may access various stored models and/or other resources (e.g., its own grammar model(s) and/or content model(s)) in generating responsive content.

The command bundle engine 120 receives annotated input from input processing engine 112, and/or input directly from client device 106, and determines whether received input invokes a command bundle of command bundles database 152. A command bundle comprises a plurality of discrete actions that can be performed by an automated assistant application. For example, a "good night" bundle can cause the automated assistant 110 to perform: a first action of transmitting a command to turn off one or more networked lights; a second action of transmitting a command to set an alarm, of a computing device of a user, to sound at 8:00 AM; and a third action of transmitting a command that requests "tomorrow's" local weather, and audibly presenting responsive content. For instance, the invocation/interaction engine 118 can transmit three different agent commands, to three different of the agents 140A-N, where each of the agent commands causes a corresponding one of the three actions to be performed.

The command bundle engine 120 can determine that received input invokes a command bundle based on various cues. For example, a command bundle can be associated with an invocation phrase, the command bundle engine 120 can receive annotated input from the input processing engine 112, and the command bundle engine 120 can determine the annotated input includes the invocation phrase for the command bundle. Also, for example, the command bundle engine 120 can determine that received input directly indicates a command bundle. For instance, input can be received in response to a user selecting a graphical user interface element (e.g., a selectable "graphical shortcut"), at client device 106, and such input can be mapped directly to the command bundle. Also, for example, the command bundle engine 120 can determine that received input corresponds to a command bundle, and that one or more contextual conditions for the command bundle are satisfied. For instance, the command bundle engine 120 can determine received input invokes a command bundle only if the received input corresponds to the command bundle and one or more contextual conditions are also satisfied (e.g., a current time is within a certain time window, it is a certain day of the week, a location of the client device 106 is within a certain geographic bound). In yet other implementations, the command bundle engine 120 can determine a command bundle is invoked without reference to any input from the client device 106. For example, certain command bundles may be invoked in response to determining only that certain contextual conditions are satisfied.

In response to determining that received input invokes a command bundle, the command bundle engine 120 causes the automated assistant 110 to perform the actions of the command bundle. The command bundle engine 120 can interact with the invocation/interaction engine 118 to cause agent command(s) to be provided to one or more of the agents 140A-N in performance of the actions of the command bundle. In some implementations, one or more of the actions of a command bundle can be performed with values that are particularized to a user that invoked the command bundle. For example, value(s), for slot(s) of agent command(s) to be provided in performance of actions of the command bundle, can be particularized to the user as described herein. The command bundle engine 120 can reference user data, of user data database 156, in determining value(s) for slot(s), for a command bundle, that are particularized to a given user.

The recommendation engine 125 determines, from command bundles database 152, command bundles that are likely relevant to a given user, and presents information related to those command bundles as recommendations to the given user. In some implementations, the recommendation engine 125 is part of the automated assistant 110 and/or presents recommendations via an assistant interface, of the client device 106, that is also utilized in other interactions with the automated assistant 110. In some implementations, the recommendation engine 125 is alternatively a component that is separate from the automated assistant 110 and/or presents recommendations via an interface that is disparate from the assistant interface of the client device 106.

Figure 2A:
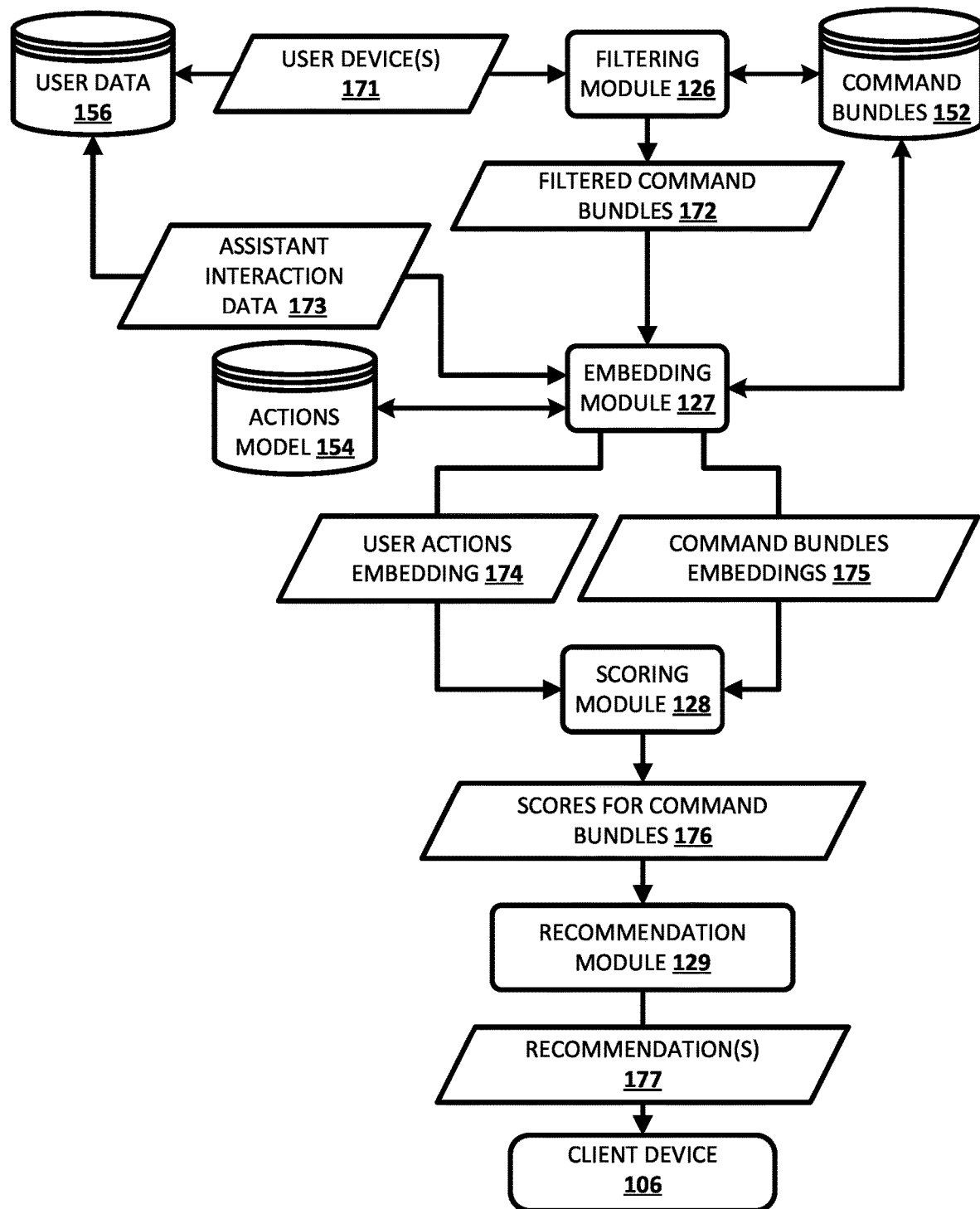
FIG. 2A and FIG. 2B illustrate an example of how various components of FIG. 1 may interact in some implementations.

Referring now to FIG. 2A, additional description is provided of the recommendation engine 125, and its modules 126-129. In FIG. 2A, the filtering module 126 selects, from command bundles database 152, a plurality of filtered command bundles 172 to provide to the embedding module 127. The filtered command bundles 172 are a subset of the corpus of command bundles contained in database 152.

The filtering module 126 can utilize various criteria in selecting the command bundles of the filtered command bundles 172. For example, in selecting the command bundles of the filtered command bundles 172, user device(s) 171 that are associated with a given user being considered in FIG. 2A can be compared to data stored in association with the command bundles in command bundles database 152. For instance, the user device(s) 171 can indicate peripheral devices (e.g., IoT devices) that are associated with the given user, and command bundles that require peripheral devices that are non-associated with the given user can be excluded from the filtered command bundles 172. As one specific example, the user device(s) 171 can indicate that the user being considered lacks any stored association with a smart thermostat and, as a result, the filtering module 126 can exclude, from the filtered command bundles 172, any command bundles that require a smart thermostat. Command bundles that require a smart thermostat can be explicitly indicated, in command bundles database 152, as requiring a smart thermostat (e.g., in a "required peripheral device(s)" field), or can be inferred based on action(s) of those command bundles (e.g., based on the command bundles each having an action that causes an agent command to be sent to a "thermostat" agent).

As used herein, a peripheral device is required for a command bundle if one or more actions of the command bundle result in the state of the peripheral device being altered. In some implementations, a user can be associated with a peripheral device if the peripheral device has been "discovered" by the automated assistant 110 and can be controlled by the automated assistant 110. In some implementations, a user can be associated with a peripheral device if user input and/or one or more network packets indicate presence of the peripheral device, even if the peripheral device has not yet been explicitly "discovered" by the automated assistant 110.

In some implementations, the filtering module 126 may utilize one or more additional and/or alternative criteria in selecting command bundles for inclusion in filtered command bundles 172 and/or in excluding command bundles from filtered command bundles 172. For example, one or more command bundles can be excluded if their rating (by multiple users) fails to satisfy a threshold and/or if a quantity and/or frequency of uses of the command bundles (across a population of users) fails to satisfy a threshold.

The filtered command bundles 172 are provided to the embedding module 127. The embedding module 127 determines command bundles embeddings 175 for the filtered command bundles 172. That is, for each of the filtered command bundles 172, the embedding module 127 determines a corresponding command bundle embedding. The embedding module 127 can determine a command bundle embedding using actions and/or other features of a command bundle, and using actions model 154. For example, indications of the actions of the command bundle can be applied as input (as part of the input or as the entirety of the input) to the actions model 154, and processed over the actions model 154 to generate a command bundle embedding. The command bundle embedding can be a plurality of values that can be mapped to a multi-dimensional space that provides a semantic representation of the corresponding command bundle embedding. For example, the command bundle embedding can be a vector of 256 values. In some implementations, the embedding module 127 can pre-generate the command bundles embeddings 175, and store the command bundles embeddings 175 in command bundles database 152, in association with their corresponding command bundles. For example, the embedding module 127 can generate a command bundle embedding for a command bundle in response to creation of the command bundle, store it in association with the command bundle in command bundles database 152, and thereafter determine the command bundle embedding for the command bundle by retrieving the stored command bundle embedding from the command bundles database 152. Additional description of implementations of generating command bundles embeddings, and a user actions embedding, are described below with respect to FIGS. 3A and 3B.

The embedding module 127 also generates a user actions embedding 174. The embedding module 127 generates the user actions embedding 174 based on assistant interaction data 173 for the user that indicates a plurality of historical actions (and optionally other feature(s) of the actions) performed for the user by the automated assistant 110. For example, indications of the historical actions performed can be applied as input (as part of the input or as the entirety of the input) to the actions model 154, and processed over the actions model 154 to generate the user actions embedding 174. The user actions embedding 174 can be a plurality of values that can be mapped to a multi-dimensional space that provides a semantic representation of the historical actions and/or other historical features. For example, the user actions embedding 174 can be a vector of 256 values. Additional description of implementations of generating user actions embeddings, and command bundles embeddings, are described below with respect to FIGS. 3A and 3B.

The scoring module 128 utilizes the user actions embedding 174, and the command bundles embeddings 175, to generate scores for the filtered command bundles 172. For example, the score for one of the filtered command bundles 172 can be based on comparison of the user actions embedding 174 to the command bundles embedding for that filtered command bundle. For instance, the score can be based on a Euclidian distance, in the multi-dimensional space, between the two embeddings (e.g., a cosine similarity measure). The score for a command bundle can optionally be further based on additional metrics, such as a rating (by multiple users) of the command bundle, quantity and/or frequency of uses of the command bundle (across a population of users), etc. For example, the score for the command bundle can be based on a function of: a cosine similarity measure between the user action embedding and the command bundle embedding of the command bundle; and a measure indicating user-assigned ratings of the command bundle, and/or a measure indicating a popularity of the command bundle.

The scores for the command bundles 176 are provided to the recommendation module 129. The recommendation module 129 provides recommendation(s) 177 to the client device 106 based on the scores for the command bundles 176. Each of the recommendation(s) 177 can be for a corresponding command bundle and can be provided for audible and/or graphical presentation to a user of the client device 106. For example, one of the recommendation(s) 177 can be for a given command bundle, and can include an invocation phrase for the given command bundle, a summary of the action(s) performed by the given command bundle, and/or other information related to the given command bundle.

The recommendation module 129 can utilize various techniques in providing recommendation(s) 177 based on the score(s) for the command bundles 176. For example, the recommendation module 129 can provide a recommendation for a given command bundle only if the score for that command bundle satisfies a threshold. Also, for example, the recommendation module 129 can provide multiple recommendations, each for a corresponding one of a plurality of command bundles, and can provide the multiple recommendations in a manner that is based on the scores for the plurality of command bundles. For example, a recommendation for the best scoring command bundle can be presented most prominently (e.g., at the top), an additional recommendation for the next best scoring command bundle can be presented next most prominently (e.g., second), etc. As yet another example, recommendations for the X best scoring command bundles can be provided for initial presentation at the client device 106, and the next Y best scoring command bundles only provided in response to further user interface input indicating a desire to receive additional recommendations.

In some implementations, the recommendation module 129 provides the recommendations independent of a query that specifies one or more search criteria for recommendations. For example, the recommendation module 129 can provide the recommendations for display in a "recommendations" interface at the client device 106 (and/or for audible presentation), without receiving any query that is based on natural language input of the user that indicates search criteria for recommendations (e.g., independent of a query such as "show me recommendations that include lighting control"). In some other implementations, the recommendation module 129 provides the recommendations in response to a query that specifies one or more search criteria for recommendations. In some of those implementations, the query can be parsed to identify one or more criteria for filtering the recommendations, and the criteria can be applied by the filtering module 126 in generating the filtered command bundles 172. For example, in response to a query of "show me recommendations that include lighting control", the filtered command bundles 172 can include only bundles that include a "lighting control" action, and the scoring module 128 can generate scores for those filtered command bundles 172 in determining filtered command bundles 172 for which to provide recommendations to the client device 106 and/or in determining how to provide the recommendations (e.g., in determining an order and/or other presentation prominences for the recommendations).

Figure 2B:
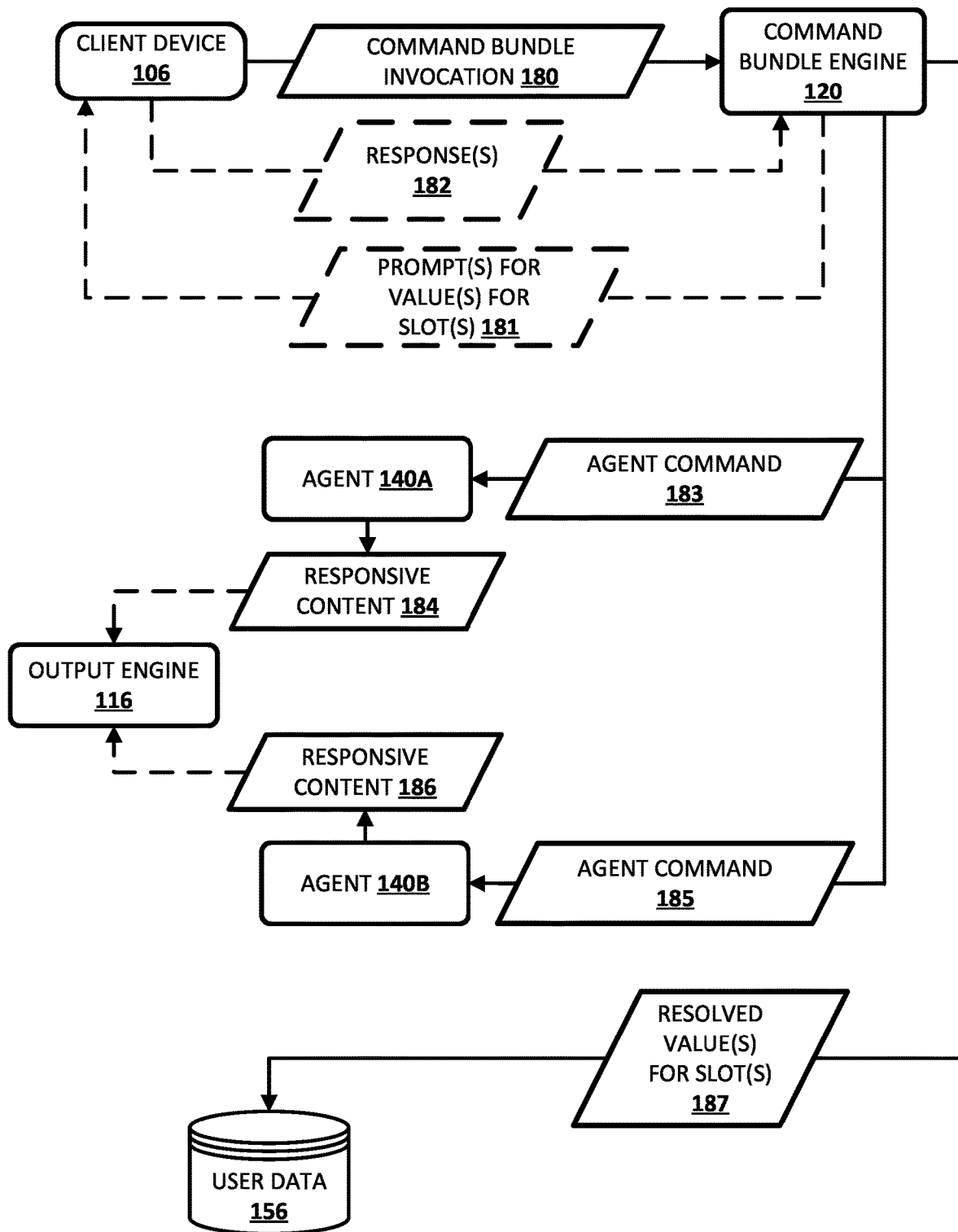

Referring now to FIG. 2B, an example is provided of implementations of how command bundle engine 120 responds in response to determining a command bundle is invoked. In FIG. 2B, a command bundle invocation 180 is received from client device 106. The command bundle invocation 180 invokes a particular command bundle and can be, for example, selecting a corresponding one of the recommendations 177 (FIG. 2A) and/or providing natural language input that includes an invocation phrase for the corresponding one of the recommendations 177.

The command bundle engine 120 receives the command bundle invocation 180, or annotated input (from input processing engine 112) that corresponds to the command bundle invocation 180. The command bundle engine 120 determines the command bundle that corresponds to the command bundle invocation 180. For example, the command bundle engine 120 can determine the command bundle with reference to command bundles database 152.

In some implementations, at least one action of the command bundle includes at least one slot that lacks a fixed value (i.e., a slot with an explicit "undefined" or "variable" value, or a slot that lacks definition of any value for the slot). In some of those implementations, e.g. when command bundle invocation 180 is an initial invocation of the command bundle by the user, the command bundle engine 120 provides prompt(s) for value(s) for slot(s) (i.e., the slot(s) that lack any fixed value) 181. In response to the prompt(s) 181, a user of the client device 106 can utilize one or more user interface input devices to provide one or more responses 182. The command bundle engine 120 can utilize the response(s) to determined resolved value(s) for those slots 187 (the slots that lack any fixed value). For example, the input processing engine 112 can process the response(s) to generated annotated input, and the command bundle engine 120 can resolve the value(s) based on such annotated input. The command bundle engine 120 can store the resolved value(s) for the slot(s) 187 in user data 156 (or other database). This enables the command bundle engine 120 to, in response to a future instance of the command bundle invocation 180 by the user (via client device 106 or another client device of the user), cause the actions of the command bundle to performed with the resolved value(s) 187—without again prompting the user for the values and/or without requiring any subsequent user confirmation of the values.

The command bundle engine 120 can also cause agent command 183 to be transmitted to agent 140A and agent command 185 to be transmitted to agent 140B. For example, the command bundle engine 120 can cause the invocation/interaction engine 118 (FIG. 1) to transmit the commands to the agents 140A and 140B. The agent command 183 and/or the agent command 185 can each optionally include one or more corresponding of the resolved value(s) for slot(s)—as determined utilizing the response(s) 182. Agent 140A generates responsive content 184 in response to the agent command 183. The responsive content 184 can cause the state of one or more peripheral devices to be altered (e.g., a light to turn on/off, adjust a brightness level, adjust an output color)—and/or can be provided to output engine 116, which can cause corresponding content to be audibly and/or graphically provided at the client device 106. Agent 140B generates responsive content 186 in response to the agent command 185. The responsive content 186 can cause the state of one or more peripheral devices to be altered—and/or can be provided to output engine 116, which can cause corresponding content to be audibly and/or graphically provided at the client device 106.

Figure 3A:
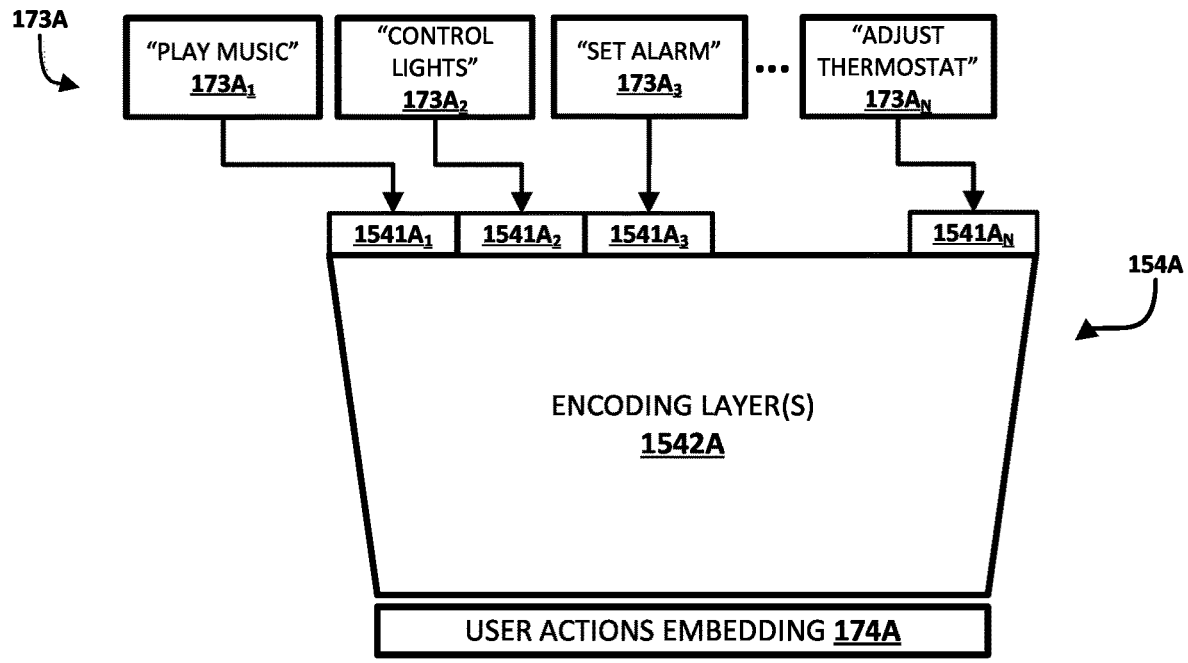
FIG. 3A and FIG. 3B each illustrate an example of an actions model, and how assistant interaction data of a user can be processed using the actions model to generate a user action embedding.
Figure 3B:
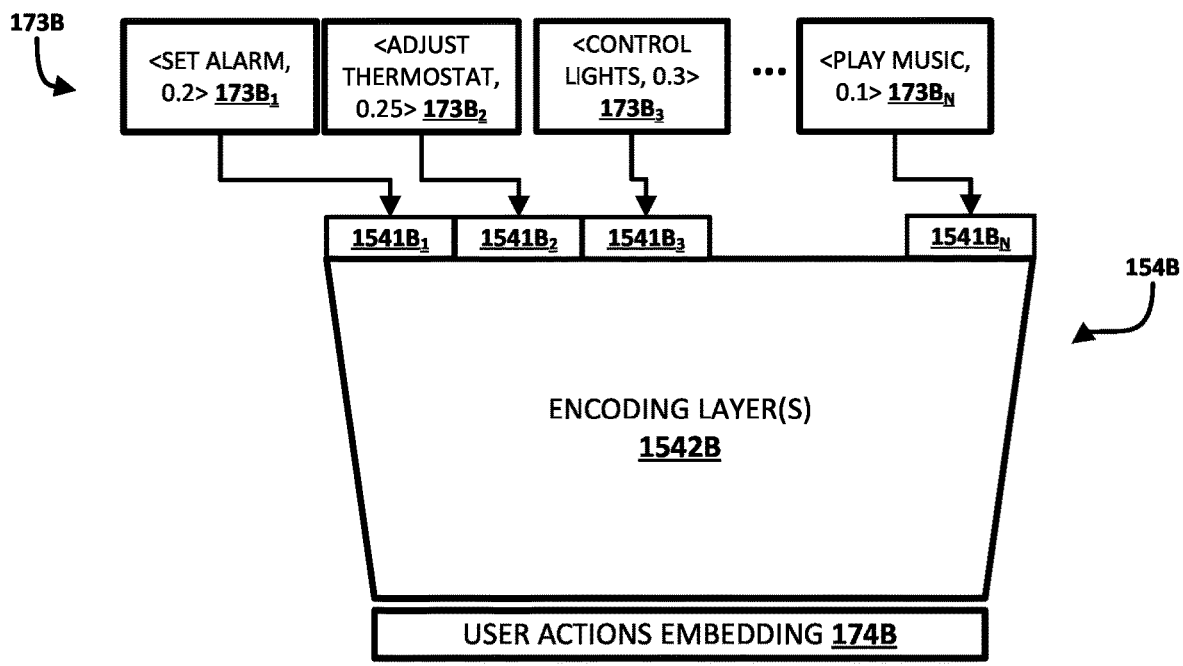

Turning now to FIGS. 3A and 3B, examples 154A and 154B of implementations of the actions model 154 (FIG. 1) are illustrated, along with examples of how assistant interaction data 173A and 173B of a user can be processed using the actions models 154A and 154B to generate user actions embeddings 174A and 174B. Description is also provided of how the actions models 154A and 154B can be utilized to generate command bundles embeddings for command bundles.

In FIG. 3A, assistant interaction data 173A is illustrated, and includes a plurality of action indications $173A_{1-N}$. The plurality of action indications $173A_{1-N}$ can indicate the N most recent actions performed for a given user by an automated assistant, in response to user interface input instances provided by the user via automated assistant interface(s) that interact with the automated assistant. The action indications $173A_{1-N}$ of FIG. 3A are illustrated with relatively coarse granularity. However, more fine-grained action indications can be provided. For example, instead of "play music" as indicated by action indications $173A_1$, action indications $173A_1$ could additionally indicate the genre of music played (e.g., reggae or classic rock) and/or the agent interacted with in performing the "play music" action (e.g., Music Agent 1 or Music Agent 2). Text that describes the action indications $173A_{1-N}$ is illustrated in FIG. 3A for the sake of clarity, and the text can be applied as the input in some implementations. However, it is understood that other values may be utilized. As one non-limiting example, a "play music" action can instead be indicated by the binary value "0010", a "control lights" action can instead be indicated by the binary value "0011", etc.

In FIG. 3A, each of the plurality of action indications $173A_{1-N}$ is applied to a corresponding one of N inputs $1541A_{1-N}$ of the actions model 154A, and can optionally be applied in any order. In some other implementations, the N inputs $1541A_{1-N}$ are applied in an order that is based on recency. For example, action indication $173A_1$ can correspond to the most recent action, action indication $173A_2$ can correspond to the second most recent action, etc. Also, in FIG. 3A each of the plurality of action indications $173A_{1-N}$ is weighted equally. However, in other implementations more recent action indications can be weighted more heavily than less recent action indications.

One or more processors can process the input action indications $173A_{1-N}$ over the encoding layer(s) 1542A to generate user actions embedding 174A. The encoding layer(s) 1542A can include one or more neural network layers, such as feed forward neural network layers. In some implementations, the encoding layer(s) 1542A are the encoding layers from an encoder-decoder network that is trained, utilizing a large quantity of training examples, to regenerate applied action indications. For example, each of the training examples can include: training example input that includes corresponding action indications, and training example output that includes the corresponding action indications. During training, the training example input of a training example can be applied to the encoding layers 1542A, and the hidden state of the encoding layers 1542A applied to decoding layers to generate predicted output that has the same dimension as the training example input. An error can then be determined based on comparing the predicted output to the training example output (which is the same as the training example input), and the error back-propagated over the decoding layers and the encoding layers 1542A to update weights of the decoding layers and the encoding layers 1542A. In this manner, the encoding layers 1542A are trained to generate a condensed representation of action indications applied as input, to thereby enable the decoding layers to generate a prediction that reproduces the action indications. After training of the encoder-decoder network, the "encoder portion" can be utilized as the encoding layers 1542A, and the output of the encoding layers 1542A can then be utilized in generating user actions embeddings and command bundle embeddings.

Although not illustrated in FIG. 3A, a command bundle embedding can be generated using the actions model 154A by applying, as input to the actions model 154A, action indications of the actions of the command bundle—optionally utilizing "padding" value(s) for any of the N action indications that are not present in the command bundle. For example, if N is 50 and the command bundle includes only 5 actions, "padding" value(s) can be utilized for 45 of the action indications. One or more processors can process the input action indications of the command bundle over the encoding layer(s) 1542A to generate a command bundle embedding for the command bundle.

In FIG. 3B, each of the plurality of action indications $173B_{1-N}$ indicates a corresponding action, and a weight for the corresponding action. For example, action indication $173B_1$ indicates a "set alarm" action and a weight of "0.2". The weight for each action indication can be based on a recency of performance of the action for the user, a quantity of occurrences of performance of the action for the user, and/or a frequency of performance of the action for the user. For example, the weight of 0.3 for the "control lights" action of action indication $173B_3$ can be based on that action being performed more recently, a greater quantity of times, and/or with a greater frequency than the other actions explicitly indicated in FIG. 3B (which all have lesser weights).

In FIG. 3B, each of the N inputs $1541B_{1-N}$ of the actions model 154B corresponds to a unique action indication. That is, input $1541B_1$ corresponds to a "set alarm" action, input $1541B_2$ corresponds to an "adjust thermostat" action, etc. In FIG. 3B, the weights for each of the action indications $173B_{1-N}$ can be applied to their corresponding inputs $1541B_{1-N}$, and processed over the encoding layers 1542B to generate user actions embedding 174B. A "0" weight or other null weight can be utilized for any inputs $1541B_{1-N}$ for which no corresponding actions have been performed for the user and/or for which the weight is otherwise "null". In some implementations, the encoding layer(s) 1542B are the encoding layers from an encoder-decoder network that is trained, utilizing a large quantity of training examples, to regenerate applied weights for action indications.

Although not illustrated in FIG. 3B, a command bundle embedding can be generated using the actions model 154B by applying, as input to the actions model 154B, "1" or other value(s) for inputs $1541B_{1-N}$ corresponding to actions of the command bundle—and applying "0" or other null weight for the other inputs $1541B_{1-N}$. For example, for a command bundle that includes only "adjust thermostat" and "control lights" actions, a "1" can be applied to each of inputs $1541B_2$ and $1541B_3$, and a "0" applied to all other inputs.

Figure 4A:
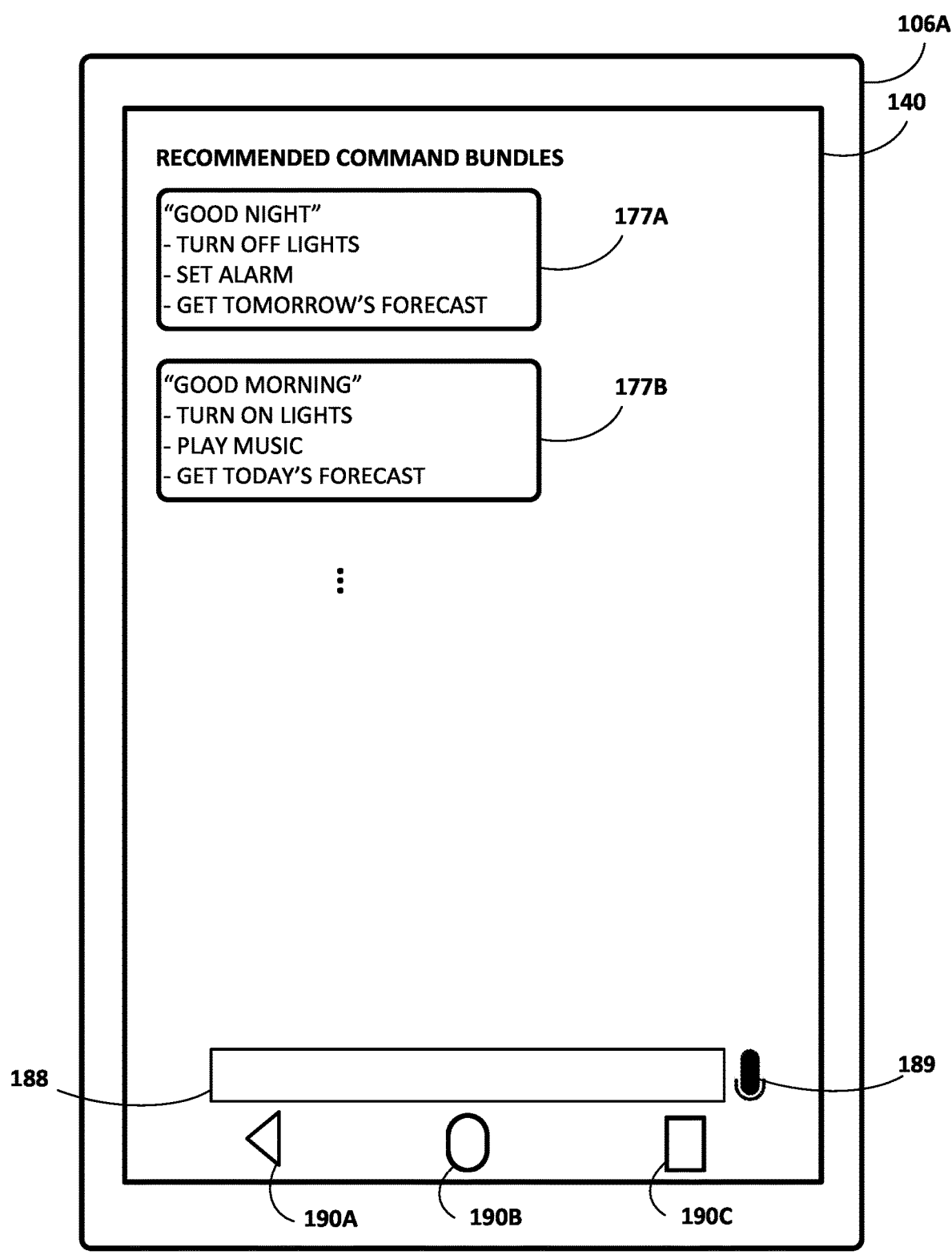
FIG. 4A illustrates an example computing device with a display screen graphically displaying recommendations for multiple command bundles.
Figure 4B:
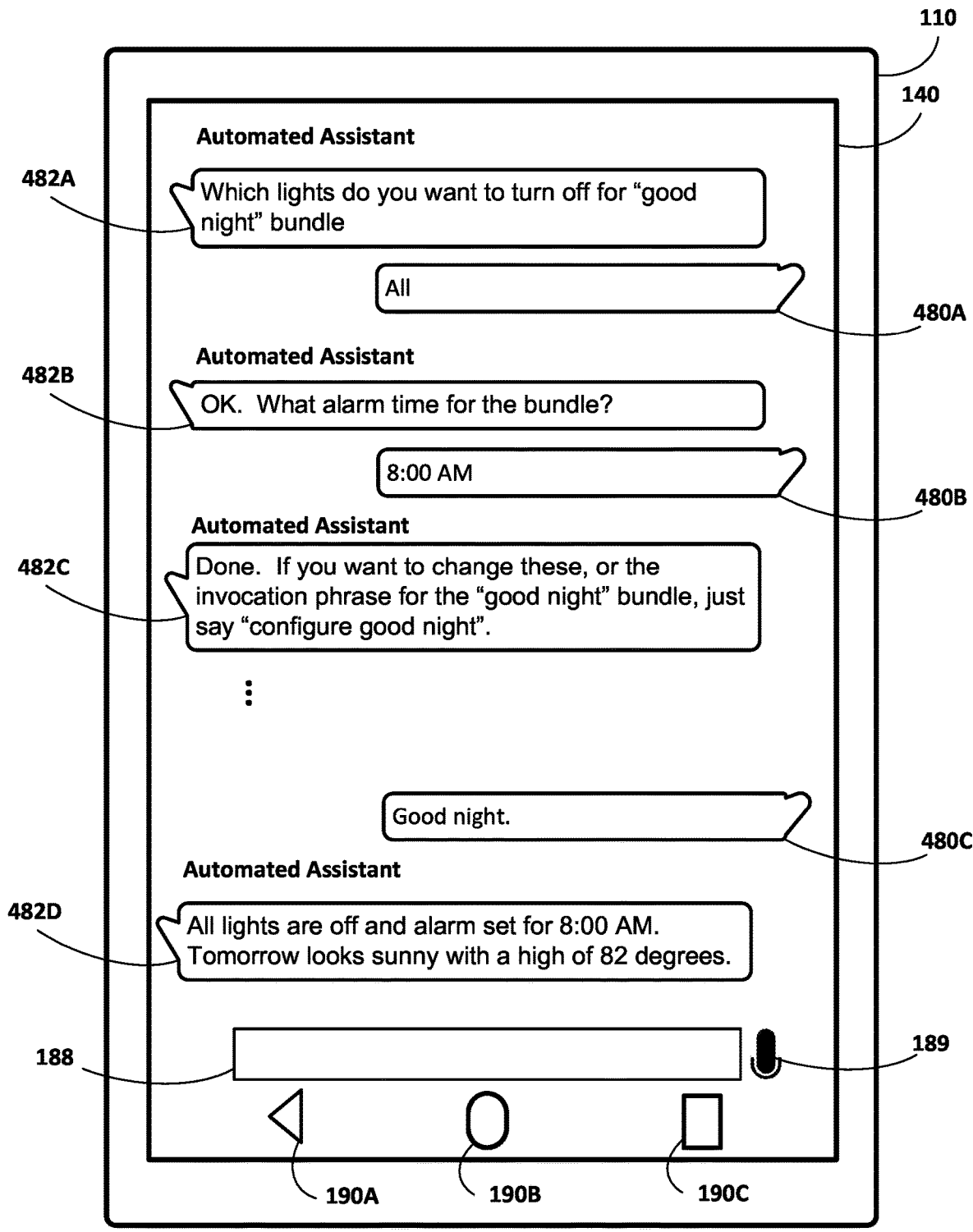
FIG. 4B illustrates the example computing device of FIG. 4A, and an example of dialog that may occur upon initial invocation of one of the command bundles of FIG. 4A, and an example of dialog that may occur upon subsequent invocation of that command bundle.

Turning now to FIGS. 4A and 4B, an example 106A of the client device 106 (FIG. 1) is illustrated. The client device 106A includes a display screen 140 which, in FIG. 4A is graphically displaying a first recommendation 177A for a first command bundle, a second recommendation 177B for a second command bundle, and optionally one or more additional recommendations (indicated by the ellipsis of FIG. 4A). In FIG. 4B the display screen 140 is displaying an example of dialog that may occur upon initial invocation of the command bundle of the recommendation 177A of FIG. 4A, and an example of dialog that may occur upon subsequent invocation of that command bundle.

The display screen 140 of FIGS. 4A and 4B further includes a textual reply interface element 188 that the user may select to generate user interface input via a virtual keyboard and a voice reply interface element 189 that the user may select to generate user interface input via a microphone. In some implementations, the user may generate user interface input via the microphone without selection of the voice reply interface element 189. For example, during the dialog, active monitoring for audible user interface input via the microphone may occur to obviate the need for the user to select the voice reply interface element 189. In some of those and/or in other implementations, the voice reply interface element 189 may be omitted. Moreover, in some implementations, the textual reply interface element 188 may additionally and/or alternatively be omitted (e.g., the user may only provide audible user interface input). The display screen 140 of FIGS. 4A and 4B also includes system interface elements 190A, 190B, 190C that may be interacted with by the user to cause the client device 106A to perform one or more actions. In other implementations, an "audio interface only" computing device may be provided that accepts only spoken input and provides only audible output (i.e., a computing device that lacks a display screen).

In FIG. 4A, the first recommendation 177A displays the invocation phrase ("good night") for the first command bundle, along with an indication of the actions that are performed by the first command bundle. Similarly, the second recommendation 177B displays the invocation phrase ("good morning") for the second command bundle, along with an indication of the action that are performed by the second command bundle. The recommendations 177A and 177B can be selected for presentation based on scoring of their corresponding command bundles as described herein. Moreover, in some implementations recommendation 177A may be presented above recommendation 177B based on scoring of their corresponding command bundles. For example, the recommendations can be ranked based on the scores of their corresponding command bundles, and recommendation 177A presented initially based on it corresponding to the best scoring command bundle.

In FIG. 4B, the command bundle, associated with the first recommendation 177A (FIG. 4A), has been initially invoked in response to user interface input. For example, the command bundle can be initially invoked based on selection by the user of the recommendation 177A (e.g., a "tap" of the recommendation 177A)—or based on the user speaking (or typing) the invocation phrase "good night". It is noted that in some implementations a user can cause his/her own preferred invocation phrase to be assigned to the command bundle. Such an invocation phrase can be utilized in lieu of the "good night" invocation phrase or as an additional invocation phrase. For example, an extra interface element can be provided and selected by the use to change the invocation phrase, for the user, to "nighty night"—or the user can change the invocation phrase through spoken command(s) provided to the automated assistant via an assistant interface (e.g., "when I say 'nighty night', run the 'good night' bundle).

In FIG. 4B, the command bundle, associated with the first recommendation 177A, lacks a fixed value for a "light(s) identifier" slot of the "turn off lights" action. Based on this, a prompt 482A is provided, by the automated assistant to the user, which solicits the user to provide input to enable resolution of a value for the "lights identifier" slot. In response, the user provides input 480A of "all", which can be resolved to a value that identifiers all lights of the user that are associated with the automated assistant.

In FIG. 4B, the command bundle, associated with the first recommendation 177A, also lacks a fixed value for an "alarm time" slot of the "set alarm" action. Based on this, a prompt 482B is provided, by the automated assistant to the user, which solicits the user to provide input to enable resolution of a value for the "alarm time" slot. In response, the user provides input 480B of "8:00 AM", which can be resolved to the corresponding time value.

The automated assistant then provides output 482C, which indicates values have been resolved, and also instructs the user of further user interface input that can be provided to alter the resolved values and/or to alter the invocation phrase for the command bundle. In some implementations, the automated assistant can further prompt the user to ensure the user wants to store the resolved values as "defaults" for the command bundle, for the user—and can optionally require affirmative user interface input in response prior to doing so. Further, in some of those implementations, the automated assistant can additionally or alternatively provide output that enables the user to instead choose to be prompted, upon each invocation of the command bundle, for the value(s) the user wishes to use for that instance for the "light(s) identifier" slot and/or the "alarm time" slot.

FIG. 4B also illustrates the user providing, at a later time, subsequent input 480C of "good night". The automated assistant can determine the input 480C is the invocation phrase for the command bundle and, in response, can cause the actions of the command bundle to be performed, with the resolved values determined through prompts 482A, 482B and inputs 480A and 480B. The automated assistant then provides further output 482D indicating that the "turn off the lights" and "set alarm" actions have been performed with the resolved values, and provides output of "Tomorrow looks sunny with a high of 82 degrees" that is received from an agent in response to the "get tomorrow's forecast" action (for which a fixed "local weather" value can be utilized). In other implementations, the further output 482D may optionally lack confirmation that the resolved values were utilized for the "turn off the lights" and "set alarm" actions. For example, output of "Lights are off and alarm set. Tomorrow looks sunny with a high of 82 degrees" can instead be provided.

Figure 5:
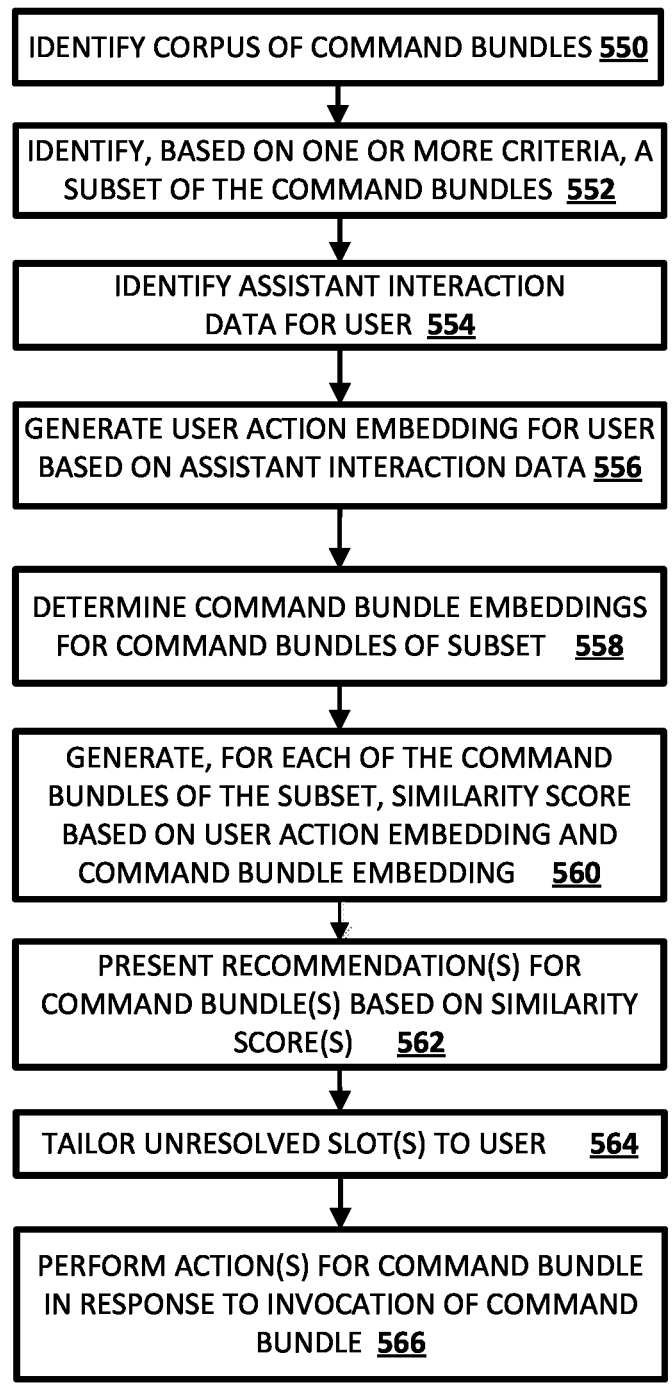
FIG. 5 is a flowchart illustrating an example method according to implementations disclosed herein.

FIG. 5 is a flowchart illustrating an example method 500 according to implementations disclosed herein. For convenience, the operations of the flow chart of FIG. 5 are described with reference to a system that performs the operations. This system may include various components of various computer systems, such as one or more components of automated assistant 110. Moreover, while operations of method 500 are shown in a particular order, this is not meant to be limiting. One or more operations may be reordered, omitted or added.

At block 550, the system identifies a corpus of command bundles.

At block 552, the system identifies, based on one or more criteria, a subset of the command bundles. The criteria can include, for example, excluding command bundles from the subset if those command bundles include actions that require any peripheral device that has not yet been paired, for the user, with the automated assistant application. A peripheral device is paired, for the user, with the automated assistant application if the peripheral device has been "discovered" by the assistant application and can be controlled by the assistant application. In some implementations, the criteria can alternatively include, for example, excluding command bundles from the subset if those command bundles include actions that require any peripheral device whose presence has not yet been detected, for the user, via user input and/or one or more network packets. In such an example, a command bundle that includes an action that requires a given peripheral device can still be included, even though the peripheral device hasn't been explicitly paired. For example, the given peripheral device can be detected based on user input (e.g., that indicates the user has the peripheral device) and/or network packets (that have characteristics indicating generation by the peripheral device), even if the peripheral device has not yet been explicitly "discovered" by the automated assistant (e.g., in response to a "discovery request" initiated in response to explicit user interface input). Additional and/or alternative criteria can be considered, such as one or more described elsewhere herein. In some implementations, block 552 can be omitted, and all command bundles of the corpus considered in subsequent blocks.

At block 554, the system identifies assistant interaction data for a user being considered in the iteration of method 500.

At block 556, the system generates a user action embedding for the user based on the assistant interaction data identified at block 554.

At block 558, the system determines command bundle embeddings for command bundles of the subset of block 552. For example, the system may have pre-generated the command bundle embeddings, stored the pre-generated command bundle embeddings in association with their corresponding command bundles, and retrieve those pre-generated command bundle embeddings from storage.

At block 560, the system generates, for each of the command bundles of the subset, a similarity score based on the user action embedding and the command bundle embedding. For example, for a given command bundle, the similarity score can be based as at least in part on a cosine similarity measure between the user action embedding and the command bundle embedding for the given command bundle.

At block 562, the system presents one or more recommendations for one or more of the command bundles based on one or more of the similarity scores of block 560. For example, the system can rank the command bundles based at least in part on the similarity scores, select one or more of the command bundles based on the ranking, and present information related to the selected command bundle(s) as recommendation(s).

At block 564, the system optionally tailors, to the user, unresolved slot(s) (if any) for action(s) of one of the command bundles of one of the recommendation(s). In some implementations, the system presents one or more prompts and utilizes one or more responses to the prompt(s) to resolve value(s) for the slot(s) and thereby tailor the unresolved slot(s). In some of those implementations, the prompt(s) are presented in response to a selection of one of the recommendations, receipt of an invocation phrase for the command bundle of one of the recommendations, and/or other user interface input that indicates a desire to cause performance of the action(s) of the command bundle and/or associate the command bundle with the user.

At block 566, the system performs action(s) of the command bundle of one of the recommendations in response to invocation of the command bundle. The action(s) can optionally be performed using one or more of the tailored values of block 564. In some implementations, performing the actions comprises transmitting one or more agent commands to one or more agents, and optionally including, in one or more of the agent commands, one or more of the tailored values for slot(s) of the agent command.

Figure 6:
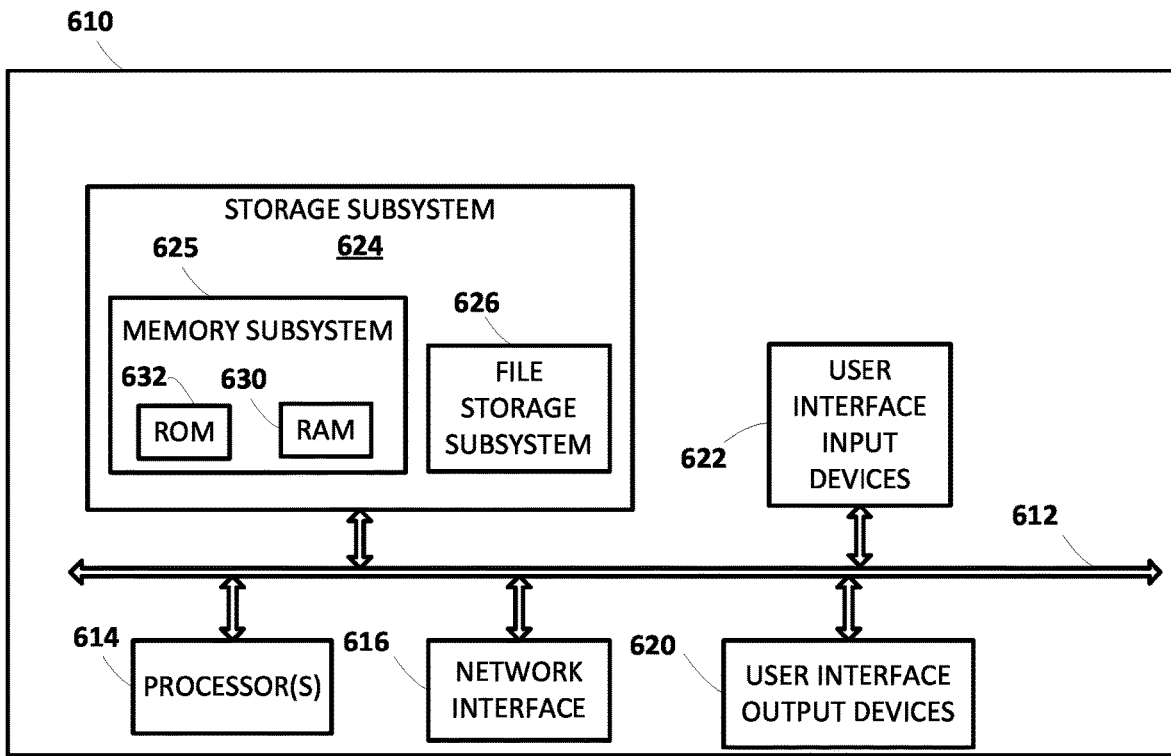
FIG. 6 illustrates an example architecture of a computing device.

FIG. 6 is a block diagram of an example computing device 610 that may optionally be utilized to perform one or more aspects of techniques described herein. In some implementations, one or more of client device 106, automated assistant 110, an agent, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5 and/or other methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

The invention claimed is:

1. A method implemented by one or more processors, the method comprising:
    causing a command bundle recommendation, for a given command bundle, to be displayed at a computing device of a particular user,
        wherein causing the command bundle recommendation to be displayed is independent of receiving any query that indicates search criteria for command bundle recommendations,
        wherein the given command bundle is created by an additional user, and
        wherein the given command bundle comprises command bundle data that identifies a plurality of discrete actions that can be performed by an automated assistant, the discrete actions including a given action that includes a slot that lacks any fixed value;
    receiving a selection at the computing device and from the particular user, the selection being of the displayed command bundle recommendation;
    in response to receiving the selection:
        engaging in interaction with the particular user and via the computing device of the particular user, to resolve a particular value for the slot that lacks any fixed value; and
        assigning the given command bundle to the particular user, including storing the particular value in association with the at least one slot, for the given command bundle and for the particular user;
    subsequent to assigning the given command bundle to the particular user:
        determining to execute the given command bundle for the particular user; and in response to determining to execute the given command bundle for the particular user:
performing the corresponding discrete actions of the given command bundle, including performing the given action using the particular value, for the slot, that was resolved in the interaction.

2. The method of claim 1, wherein the given command bundle includes an invocation phrase for invoking the given command bundle, and wherein determining to execute the given command bundle for the particular user comprises:
processing spoken input, of the particular user, to determine that the spoken input includes the invocation phrase for the given command bundle; and
determining to execute the given command bundle for the particular user in response to determining that the spoken input includes the invocation phrase, for the given command bundle, and based on the given command bundle being assigned to the particular user.

3. The method of claim 1, wherein the given command bundle includes one or more contextual conditions that, when satisfied, automatically invoke the given command bundle, and wherein determining to execute the given command bundle for the particular user comprises:
determining satisfaction of the one or more contextual conditions, for the particular user; and
automatically invoking the given command bundle, for the particular user, responsive to the determining satisfaction of the one or more contextual conditions, for the particular user, and based on the given command bundle being assigned to the particular user.

4. The method of claim 3, wherein the one or more contextual conditions include a certain time window, a certain day of the week, and/or a location of a client device being within a geographic bound.

5. The method of claim 3, wherein the one or more contextual conditions include two or more of: a certain time window, a certain day of the week, or a location of a client device being within a geographic bound.

6. The method of claim 1, wherein the command bundle recommendation includes an invocation phrase for the given command bundle and an indication of the discrete actions of the given command bundle.

7. The method of claim 1, wherein engaging in the interaction comprises:
providing a prompt to the particular user;
receiving natural language input in response to the prompt; and
resolving the particular value based on the natural language input.

8. The method of claim 7, wherein the particular value specifies one or more Internet of things devices.

9. The method of claim 7, wherein the particular value specifies a particular time of day.

10. The method of claim 1, wherein causing the command bundle recommendation to be displayed at the computing device of the particular user is based on comparing command bundle data, for the given command bundle, to assistant interaction data for the particular user, the assistant interaction data indicating a plurality of historical actions performed for the particular user by the automated assistant.

11. The method of claim 1, wherein the command bundle data comprises a command bundle embedding, and wherein comparing the command bundle data to the assistant interaction data for the particular user comprises:
generating a user action embedding based on processing at least part of the assistant interaction data for the particular user, and
comparing the user action embedding to the command bundle embedding.

12. A system, comprising:
memory storing instructions;
one or more processors are operable to execute the instructions to cause the one or more processors to:
cause a command bundle recommendation, for a given command bundle, to be displayed at a computing device of a particular user,
wherein causing the command bundle recommendation to be displayed is independent of receiving any query that indicates search criteria for command bundle recommendations,
wherein the given command bundle is created by an additional user, and
wherein the given command bundle comprises command bundle data that identifies a plurality of discrete actions that can be performed by an automated assistant, the discrete actions including a given action that includes a slot that lacks any fixed value;
receive a selection at the computing device and from the particular user, the selection being of the displayed command bundle recommendation;
in response to receiving the selection:
engage in interaction with the particular user and via the computing device of the particular user, to resolve a particular value for the slot that lacks any fixed value; and
assign the given command bundle to the particular user, wherein in assigning the given command bundle to the particular user one or more of the processors are to store the particular value in association with the at least one slot, for the given command bundle and for the particular user;
subsequent to assigning the given command bundle to the particular user:
determine to execute the given command bundle for the particular user; and
in response to determining to execute the given command bundle for the particular user:
perform the corresponding discrete actions of the given command bundle, including performing the given action using the particular value, for the slot, that was resolved in the interaction.

13. The system of claim 12, wherein the given command bundle includes an invocation phrase for invoking the given command bundle, and wherein in determining to execute the given command bundle for the particular user one or more of the processors are to:
process spoken input, of the particular user, to determine that the spoken input includes the invocation phrase for the given command bundle; and
determine to execute the given command bundle for the particular user in response to determining that the spoken input includes the invocation phrase, for the given command bundle, and based on the given command bundle being assigned to the particular user.

14. The system of claim 12, wherein the given command bundle includes one or more contextual conditions that, when satisfied, automatically invoke the given command bundle, and wherein in determining to execute the given command bundle for the particular user one or more of the processors are to:
determine satisfaction of the one or more contextual conditions, for the particular user; and automatically invoke the given command bundle, for the particular user, responsive to the determining satisfaction of the one or more contextual conditions, for the particular user, and based on the given command bundle being assigned to the particular user.

15. The system of claim 14, wherein the one or more contextual conditions include a certain time window, a certain day of the week, and/or a location of a client device being within a geographic bound.

16. The system of claim 12, wherein the command bundle recommendation includes an invocation phrase for the given command bundle and an indication of the discrete actions of the given command bundle.

17. The system of claim 16, wherein engaging in the interaction comprises:
providing a prompt to the particular user;
receiving natural language input in response to the prompt; and
resolving the particular value based on the natural language input.

18. The system of claim 17, wherein the particular value specifies one or more Internet of things devices.

19. The system of claim 17, wherein the particular value specifies a particular time of day.

20. The system of claim 12, wherein causing the command bundle recommendation to be displayed at the computing device of the particular user is based on comparing command bundle data, for the given command bundle, to assistant interaction data for the particular user, the assistant interaction data indicating a plurality of historical actions performed for the particular user by the automated assistant.

* * * * *